(12) United States Patent
Chirayath et al.

(10) Patent No.: US 9,710,500 B2
(45) Date of Patent: Jul. 18, 2017

(54) ACCESSING DATA AND FUNCTIONALITY IN DATABASE SYSTEMS

(75) Inventors: Vinod P. Chirayath, Olathe, KS (US); Zackery M. England, Overland Park, KS (US); Venkatesh S. Gopal, Overland Park, KS (US); Salvador Ledezma, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/275,941

(22) Filed: Oct. 18, 2011

(65) Prior Publication Data

US 2013/0097193 A1   Apr. 18, 2013

(51) Int. Cl.
*G06F 17/30* (2006.01)

(52) U.S. Cl.
CPC ............... *G06F 17/30306* (2013.01)

(58) Field of Classification Search
CPC ............ G06F 17/30864; G06F 17/30306
USPC .......................................... 707/778
See application file for complete search history.

(56) References Cited

U.S. PATENT DOCUMENTS

| | | | |
|---|---|---|---|
| 6,011,562 A * | 1/2000 | Gagne et al. ............. | 345/473 |
| 6,353,452 B1 * | 3/2002 | Hamada ............ | G06F 17/30392 707/999.004 |
| 7,039,647 B2 * | 5/2006 | Lowe ............... | G06F 17/3064 |
| 7,712,043 B2 | 5/2010 | Li et al. | |
| 7,809,703 B2 * | 10/2010 | Balabhadrapatruni et al. ............... | 707/705 |
| 2003/0093408 A1 * | 5/2003 | Brown ............. | G06F 17/30336 |
| 2004/0199539 A1 * | 10/2004 | Richardson et al. ......... | 707/102 |
| 2006/0179035 A1 | 8/2006 | Broker | |
| 2006/0212471 A1 * | 9/2006 | Lundberg et al. ............ | 707/102 |
| 2007/0016604 A1 * | 1/2007 | Murthy et al. ................ | 707/102 |
| 2008/0215528 A1 * | 9/2008 | Sedlar ............... | 707/1 |
| 2009/0177988 A1 * | 7/2009 | Martins ......................... | 715/764 |
| 2010/0306259 A1 | 12/2010 | Svinth | |
| 2010/0332325 A1 * | 12/2010 | Holte ......................... | 705/14.54 |
| 2011/0209094 A1 * | 8/2011 | Gasn ................ | G06F 17/30557 715/843 |

\* cited by examiner

*Primary Examiner* — Cam-Y Truong
(74) *Attorney, Agent, or Firm* — DeLizio Law, PLLC (57) ABSTRACT

Some embodiments include a method for searching a hierarchical database structure of a database management system. In some embodiments, the method comprises detecting text input in a database search field, wherein the text input defines a search for data in the hierarchical database structure, wherein the hierarchical database structure includes items, and wherein the items include one or more of actions to be performed on data in the hierarchical database structure, indexes for looking up data in the hierarchical database structure, and database schemas defining databases in the hierarchical database structure. The method can also comprise selecting items in the hierarchical database structure based on the text input; presenting selectable options, wherein the selectable options are associated with the items in the hierarchical database structure; detecting selection of one of the selectable options, and presenting data associated with the one of the items.

15 Claims, 5 Drawing Sheets

ACCESSING DATA AND FUNCTIONALITY IN DATABASE SYSTEMS

BACKGROUND

Embodiments of the inventive subject matter generally relate to the field of database systems, and more particularly to tools for accessing information and functionality from database systems.

Databases often store very large volumes of data, such as employment records, computer logs, or other suitable information. Databases typically store this information for use by various software components, such as web servers, application programs, etc. To keep the databases in working order, database administrators typically access and organize database information.

Database administrators typically use database tools to view database information, organize information for faster look-ups, organize information to save storage space, and otherwise maintain databases for reliable operation. Some database tools require that administrators have knowledge of a database hierarchy to access data. For example, if an administrator wants to view a particular database table, the database tool may require that the administrator provide a path to the table. If the administrator provides such a path, the tool follows the path and shows the table. However, if the administrator cannot provide the path, the tool may not present the desired table. Thus, there is a need for more flexible and user-friendly database tools.

SUMMARY

Some embodiments include a method for searching a hierarchical database structure of a database management system. In some embodiments, the method comprises detecting text input in a database search field, wherein the text input defines a search for data in the hierarchical database structure, wherein the hierarchical database structure includes items, and wherein the items include one or more of actions to be performed on data in the hierarchical database structure, indexes for looking up data in the hierarchical database structure, and database schemas defining databases in the hierarchical database structure. The method can also comprise selecting items in the hierarchical database structure based on the text input; presenting selectable options, wherein the selectable options are associated with the items in the hierarchical database structure; detecting selection of one of the selectable options, and presenting data associated with the one of the items.

In some embodiments, the selectable options appear as text in the graphical user interface.

In some embodiments, the method further comprises detecting that the text input defines a path to another one of the items in the hierarchical database structure, accessing the other one of the items by traversing the path in the hierarchical database structure, and presenting, in the graphical user interface, data associated with the one of the items.

In some embodiments, the actions include view data, query, alter, drop, view hierarchy.

In some embodiments, the data associated with the one of the items includes one or more of: at least a portion of the database schemas, and at least a portion of the indexes.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows describes exemplary systems, methods, techniques, instruction sequences and/or computer program products that embody techniques of the present inventive subject matter. However, the described embodiments may be practiced without these specific details. In some instances, for clarity, some well-known instruction instances, protocols, structures, and techniques may not be shown in detail.

Introduction

Some embodiments of the inventive subject matter enable database administrators to access database data, and utilize various database functions without much knowledge of how a database is organized. For example, in some embodiments, an administrator may provide, to a database tool, search terms in a text box. The tool can determine database data and/or functionality based on the search terms, and present user-selectable options. In turn, by selecting one of the user-selectable options, the administrator can access the desired database data and/or functionality. As a result, some embodiments enable database administrators to access database data and/or functionality with little knowledge about the database organization.

Figure 1:
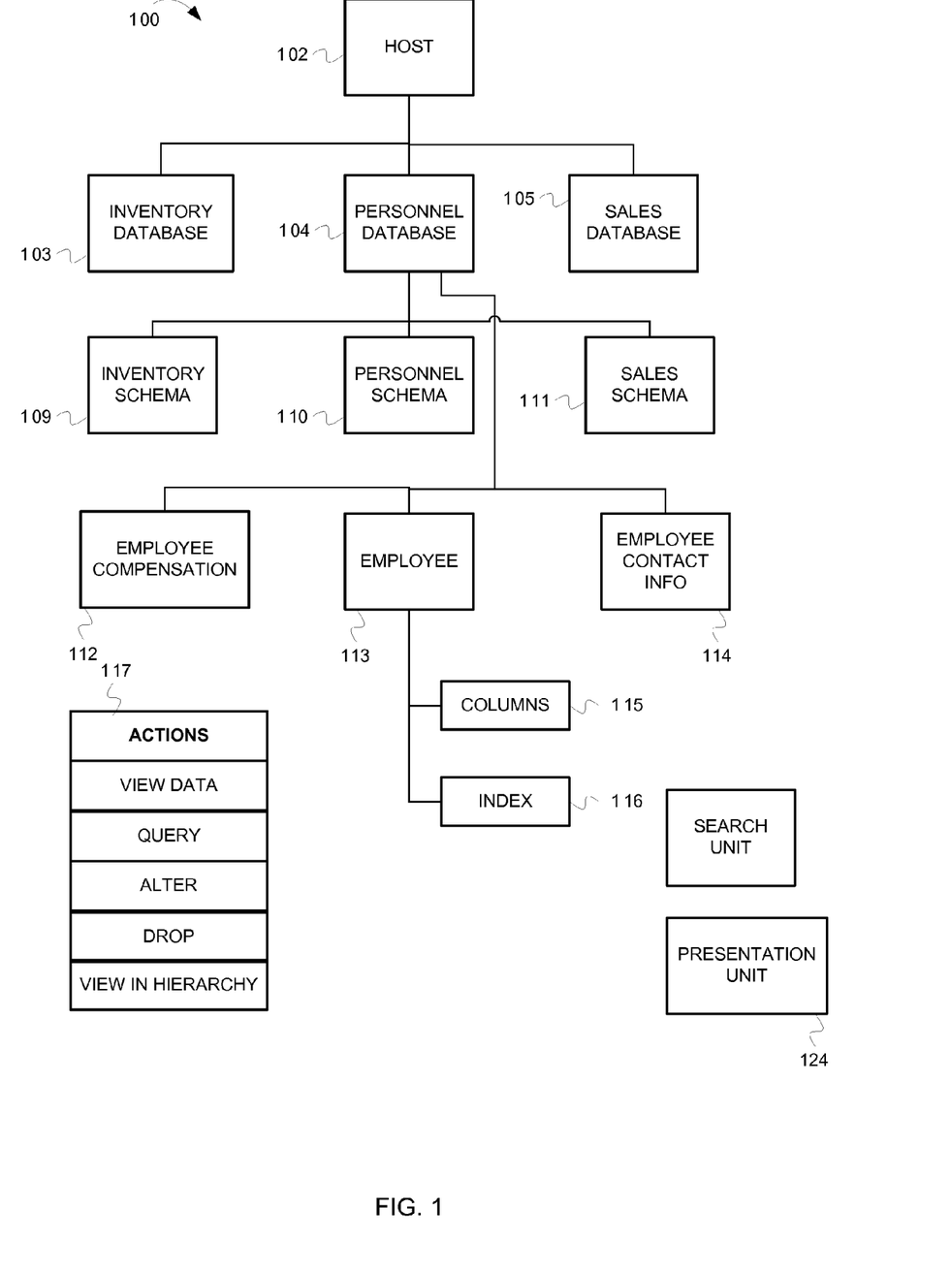
FIG. 1 is a block diagram illustrating a database system, according to some embodiments of the inventive subject matter.
Figure 2:
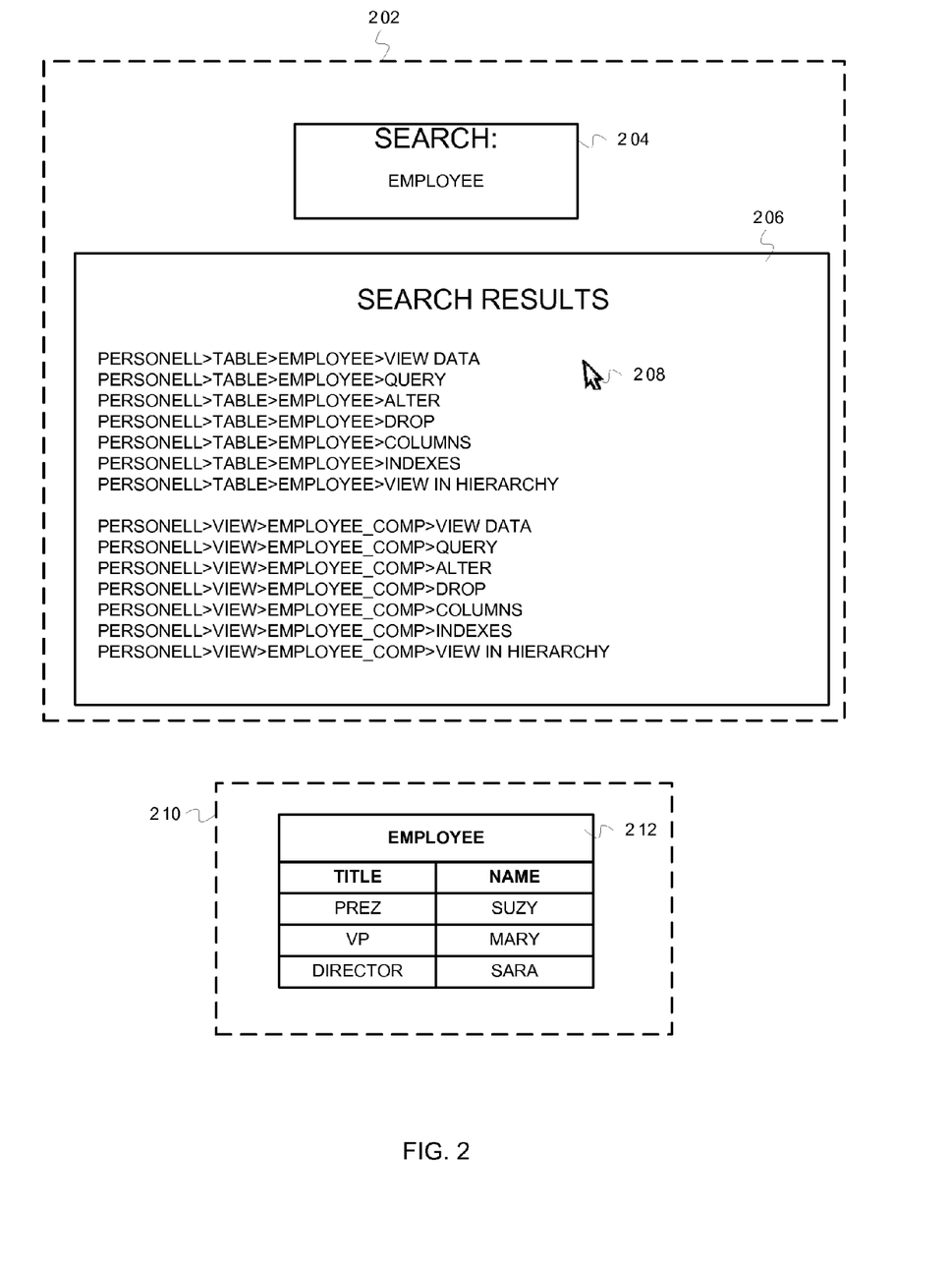
FIG. 2 is a block diagram illustrating how the database system 100 can provide data and functionality based on text search terms, according to some embodiments of the inventive subject matter.

FIGS. 1 and 2 show how some embodiments operate. FIG. 1 is a block diagram illustrating a database system, according to some embodiments of the inventive subject matter. In FIG. 1, a database system 100 includes three databases—inventory database 103, personnel database 104, and sales database 105. The databases 103, 104, and 105 can be associated with any suitable number of database objects, which can include schemas, bufferpools, table spaces, etc. FIG. 1 shows some objects that may be associated with a database in the database system 100. The personnel database 104 is associated with a schema 110, and tables 112, 113, and 114 (employee compensation 112, employee 113, and employee contact information 114). The tables include columns 115. As shown, the employee table 113 is associated with an index 116. Just as the personnel database 104 includes schemas, tables, and other options, the other databases 103 and 105 can also include suitable objects (although not shown in FIG. 1).

The database system 100 also includes components for providing functionality associated the databases 103, 104 and 105. More specifically, the system 100 includes actions 117 that allow administrators to view, modify, and otherwise manipulate the database information. The actions 117 include: View Data, Query, Alter, Drop, and View in Hierarchy. Although not shown, the actions 117 can include any other suitable database actions. In some embodiments, each of the actions can be associated with a number of objects. If an action is associated with an object, the action can provide some functionality for the object. For example, the View Data action may present some all or part of an object's data on a display device. Associations between the objects and actions are not shown in FIG. 1, but are maintained in the database system 100. Embodiments of the database system 100 can include actions and data other than those shown in FIG. 1.

The database system 100 also includes components that enable database administrators access data and functionality of the database. The system 100 includes a search unit 122 and presentation unit 124. The search unit 122 can receive search terms (e.g., via a graphical user interface, command line, etc.), and search the database system for data and/or functionality associated with the search terms. After the search unit 122 determines data and/or functionality associated with the search terms, the presentation unit 124 can present user-selectable options in a graphical user interface (GUI). After a user selectable option is selected via a GUI, the search unit 122 performs operations for the selected option (i.e., provides the data and/or functionality associated with the selection option).

FIG. 2 is a block diagram illustrating how the database system 100 can provide data and functionality based on text search terms, according to some embodiments of the inventive subject matter. In FIG. 2, a graphical user interface 202 includes a search window 204, and search results window 206. A database administrator can enter search terms into the search window 204. As shown, the database system receives the search terms in textual form. In the example shown in FIG. 2, an administrator entered the search term "EMPLOYEE" in the search window 204. Referring back to FIG. 1, the database system 100 includes the personnel database 104. After receiving the search terms, the database system 100 analyses its data (including actions, database tables, indexes, etc.) to determine a result for the search.

The database system 100 presents results in the search results window 206. The database administrator can select any of the options in the search results window 206. As shown, the search results include user-selectable text stings that indicate actions and/or data that are available upon selection. For example, the upper-most result is: PERSONELL>TABLE>EMPLOYEE>VIEW_DATA Upon selection (e.g., using a mouse cursor 208) of the upper-most user-selectable option, the database system presents the personnel database's employee table 113 in a GUI window 210. Although FIG. 2 shows some windows and interfaces, embodiments can present the information in any suitable interface(s) and window(s). Selection of the other user-selectable options has a similar result (i.e., the system performs operations indicated in the user-selectable options).

Because the database system 100 can present database information and perform database actions based on search terms, database administrators need not have knowledge of how the database system stores information and functionality (e.g., database administrators need not know the database hierarchy for storing data and functionality). Instead, the database administrator needs very little knowledge about the database system and databases, as the system 100 provides a plurality of selectable options that may be related to the administrator's search terms.

Some embodiments of the database system offer predictive-search results based on text entered into the search window 204. That is, before receiving all search terms in the search window 204, the system begins presenting user-selectable search results in the search results window 206. In some instances, the system may receive search terms that do not match any data or actions. However, the predictive-search function determines data or actions that may be related to the search terms. For example, a search term may include the word "employer." Although the database system does not include data or actions matching "employer," the system presents options that may be related, such as those shown in the results window 206.

Figure 3:
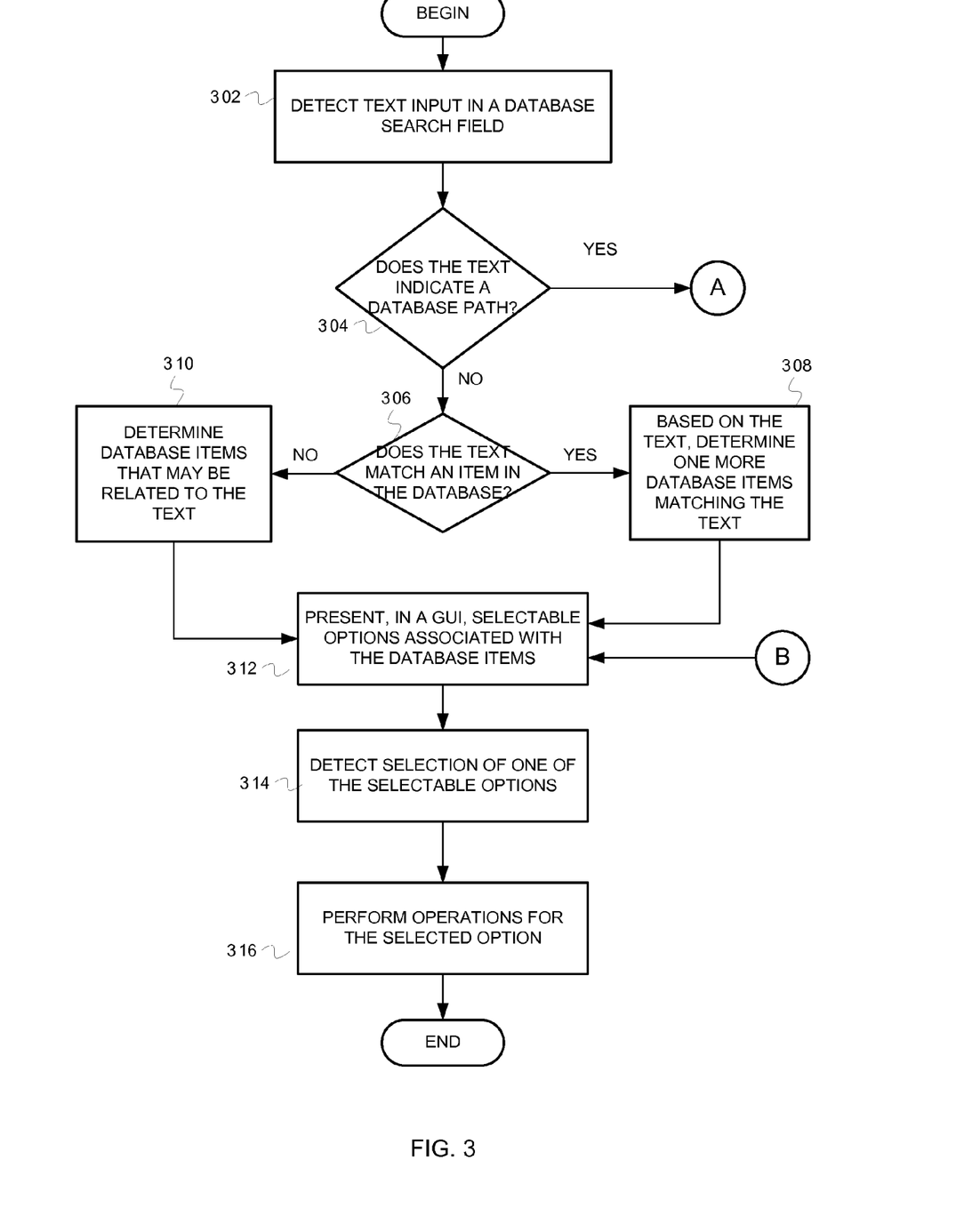
FIGS. 3 and 4 illustrate a flow diagram including operations for searching a database system using search terms, according to some embodiments of the inventive subject matter.
Figure 4:
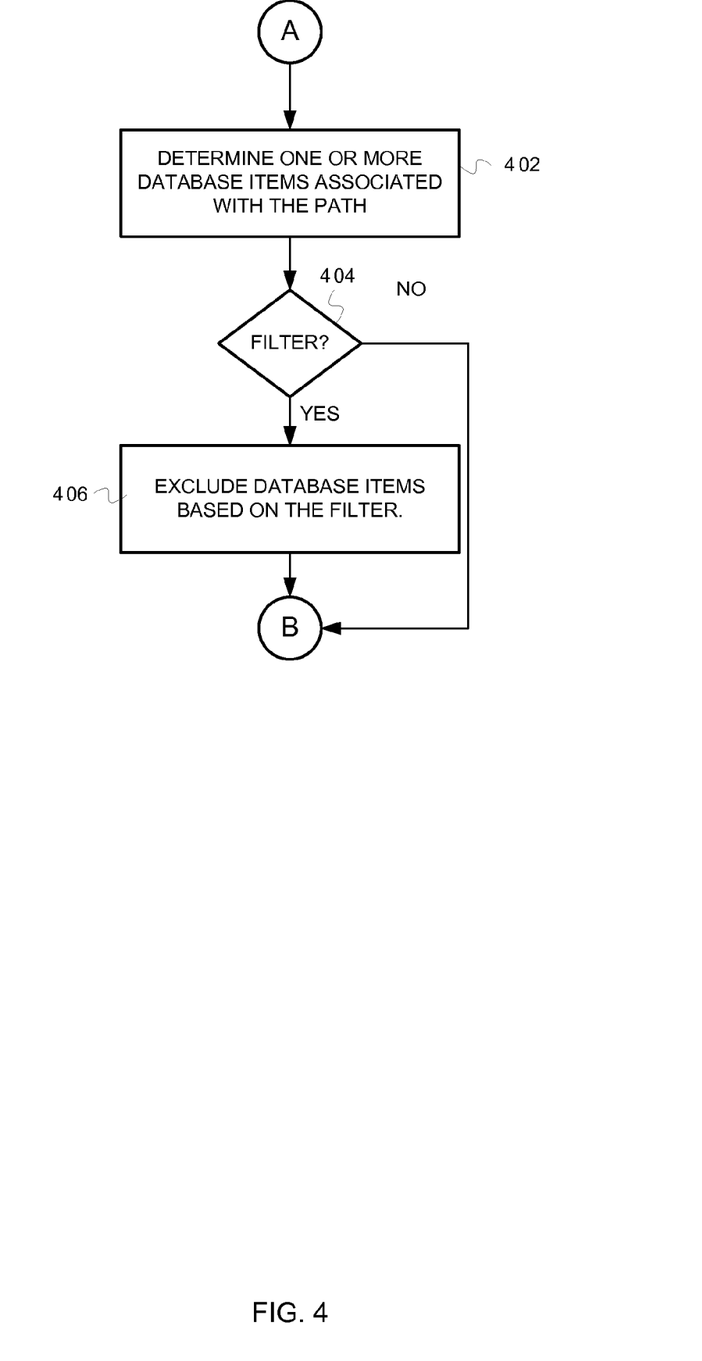

FIGS. 3 and 4 illustrate a flow diagram including operations for searching a database system using search terms, according to some embodiments of the inventive subject matter. The flow begins at block 302, in FIG. 3, where the database system's search unit detects text input in a search window. For example, the search unit may detect the following text: EMPLOYEE. The flow continues at block 304.

At block 304, the search unit determines whether the text includes a database path. In some embodiments, database administrators can provide explicit paths to items (i.e., data and/or actions) in the database system. For example, an administrator may enter the following text in the search window: //PERSONELL/EMPLOYEE/VIEW DATA, where double forward slash ("//") indicates an explicit path, and where the path begins at the PERSONELL DATABASE (104). In some embodiments, because the View Data action is associated with the employee table 113, the view data action is included in the path (not shown in FIG. 1). If the text includes a path, the flow continues at "A," which continues in FIG. 4. Referring to FIG. 4, at block 402, the search unit determines one or more database items associated with the path. In some instances, the path leads to a plurality of database items. The flow continues at block 404.

At block 404, the search unit determines whether to filter some of the database items. In some embodiments, the text string indicates a particular filter. For example, certain text, such as a keyword in square brackets ("[keyword]"), indicate certain filters. If a filter should be applied to the search, the flow continues at block 406. Otherwise, the flow continues at "B," which leads to block 310, in FIG. 3. At block 406, the search unit excludes database items based on the filter. For example, a filter "[table]" may indicate to the search unit to filter-out views, sequences, stored procedures, etc. under a particular schema.

As noted above, some embodiments provide predictive search results. For such embodiments, the flow may loop back to 302 and determine new/different database items as more text is received. From bock 406, the flow continues at "B," which leads to block 310, in FIG. 3.

As discussed above, if no path is indicated in the text received in the search window, the flow continues to block 306. At block 306, the search unit determines whether one or more database items (e.g., actions and/or data) match the text. For example, the search unit determines whether a database item is associated with an identifier matching the text. Some example identifiers associated with database items are shown in FIG. 1 (e.g., EMPLOYEE, EMPLOYEE COMPENSATION, VIEW DATA, etc.). If the text matches an identifier, the flow continues at block 308, where the search unit determines one or more database items matching the text. From block 308, the flow continues at block 312. If the text does not match an identifier, the flow continues at block 310, where the search unit determines database items that may be related to the text. That is, if there is not an exact match, the search unit can select database items whose identifiers are partial matches or otherwise related (e.g., logically related actions, lexicographically related identifiers, database items recently accessed, etc.). In some instances, if there is no relationship between the text and database items, the search unit may select the most often selected database items. From block 310, the flow continues at block 312.

At block 312, the database system's presentation unit presents, in a graphical user interface, user-selectable options associated with the database items. For example, for the database items selected at blocks 308/310, the presentation unit presents one or more selectable text strings, such as those shown in FIG. 2. The flow continues at block 314.

At block 314, the search unit detects selection of a user-selectable option. For example, referring to FIG. 2, an administrator selects the top-most user-selectable options by clicking it with a mouse cursor 208. The flow continues at block 316, where the database system performs operations for the selected option. For example, referring to FIG. 2, the system performs operations for presenting the table 212.

Figure 5:
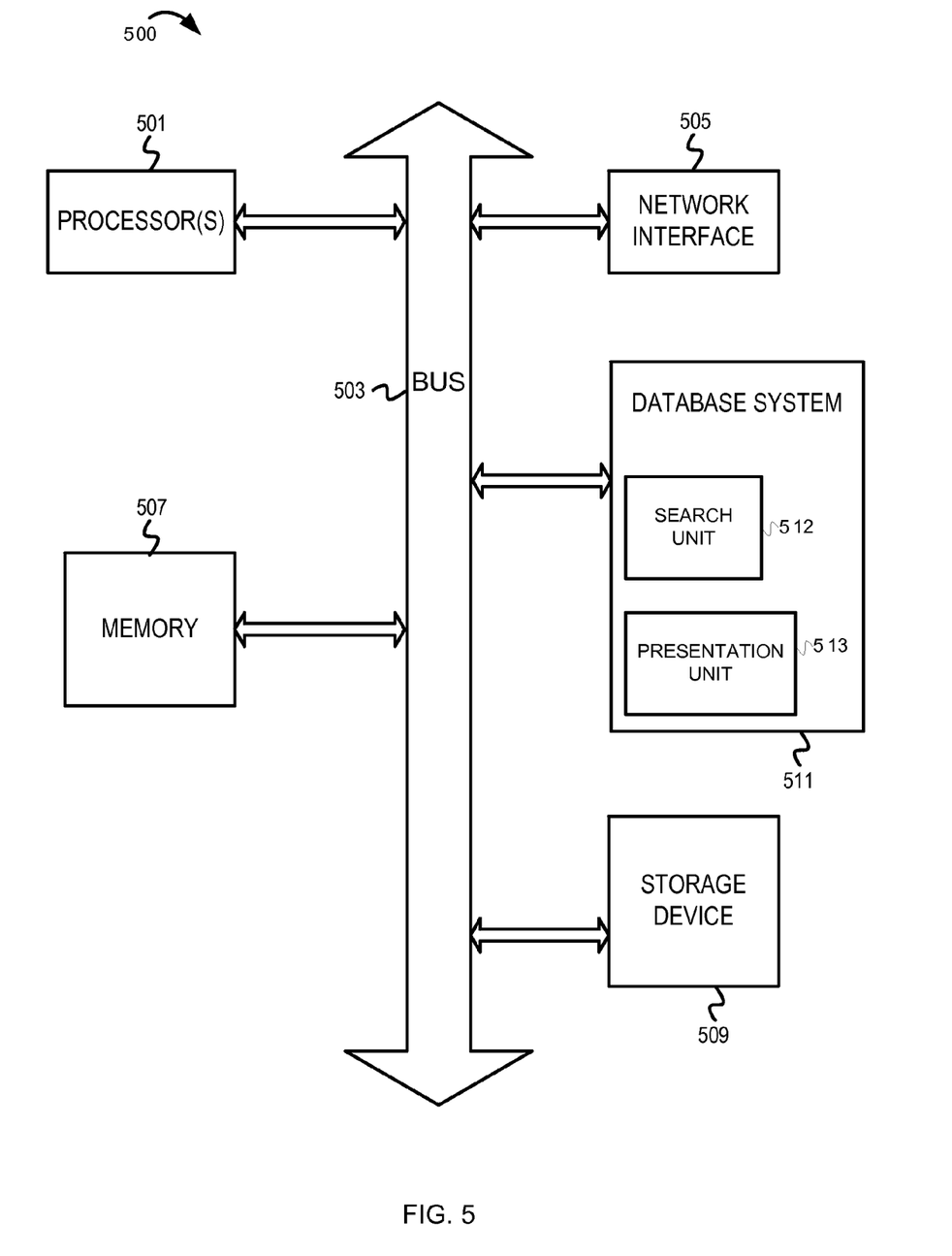
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). A database system 511 is also connected to the bus 503. The database system 511 includes a search unit 512 and presentation unit 513. The database system 511 is capable of performing the operations described above, in the discussion of FIGS. 3 and 4. In some embodiments, the database system 511 can reside in the memory 507 and/or in the storage device 509. That is, the system memory 507 can embody functionality to implement embodiments described above. The system memory 507 may include one or more functionalities that facilitate the operations of FIGS. 3 and 4. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for providing database system search results as described herein may be implemented with facilities consistent with any hardware system or hardware systems. Many variations, modifications, additions, and improvements are possible.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for searching a hierarchical database structure of a database management system, the method comprising:
   detecting, by a processor, text input in a database search field of a graphical user interface of a computer system, wherein the text input defines a search for data in the hierarchical database structure, wherein the hierarchical database structure includes items, indexes for looking up data in the hierarchical database structure, and database schemas defining databases in the hierarchical database structure, and wherein the items include one or more of actions to be performed on data in the hierarchical database structure;
   if the text input does not include text specifying a path in the hierarchical database structure, determining, by the processor, that there is no exact match between the text input and items in the hierarchical database;
   selecting, by the processor, items for presentation on the graphical user interface from the hierarchical database structure based on the text input for inclusion in search results, wherein the text input includes one or more keywords specifying one or more filters to be applied to during selection of items in the hierarchical database structure, wherein the one or more filters include one or more filters to exclude views, sequences or stored procedures;
   in response to the determining that there is no exact match between the text input and items in the hierarchical database, presenting, by the processor, the search results in the graphical user interface on a display device, the search results comprising items in the hierarchical database that are potentially related to the text input, wherein an entry for an item in the search results includes at least one lexicographically related identifier for a table name corresponding to an item in the search results and a logically related selectable option associated with a table corresponding to the table name, wherein the logically related selectable option comprises an action to be performed with respect to the table, the action including at least one of drop table, view data, query and view hierarchy for altering the table from the hierarchical database structure; and
   detecting input representing a user's selection of the logically related selectable option.

2. The method of claim 1, wherein the selectable option appears as text in the graphical user interface.

3. The method of claim 1 further comprising:
   detecting that the text input defines a path to another one of the items in the hierarchical database structure; accessing the other one of the items by traversing the path in the hierarchical database structure; and presenting, in the graphical user interface, data associated with the one of the items.

4. The method of claim 1, wherein a second entry for an item in the search results includes the least one lexicographically related identifier for the table name corresponding to an item in the search results and a second logically related selectable option of the plurality of selectable options associated with the table corresponding to the table name, wherein the second logically related selectable option comprises a second action to be performed with respect to the table, the second action including at least one of drop table, view data, query, or view hierarchy.

5. The method of claim 1, wherein the data associated with the one of the items includes one or more of: at least a portion of the database schemas, and at least a portion of the indexes.

6. A device for searching a hierarchical database structure of a database management system, the device comprising:
   one or more processors;
   a search unit executable by the one or more processors and configured to detect text input in a database search field of a graphical user interface of a computer system, wherein the text input defines a search for data in the hierarchical database structure, wherein the hierarchical database structure includes items, indexes for looking up data in the hierarchical database structure, and database schemas defining databases in the hierarchical database structure, and wherein the items include one or more of actions to be performed on data in the hierarchical database structure;
   if the text input does not include text specifying a path in the hierarchical database structure, determining that there is no exact match between the text input and items in the hierarchical database;
   select items for presentation on the graphical user interface from the hierarchical database structure based on the text input for inclusion in search results, wherein the text input includes one or more keywords specifying one or more filters to be applied to during selection of items in the hierarchical database structure, wherein the one or more filters include one or more filters to exclude views, sequences or stored procedures;

detect input representing a user's selection of one of a plurality of logically related selectable options, wherein the one of the plurality of logically related selectable options is associated with one of the items in the search results; and a presentation unit executable by the one or more processors and configured to, in response to a determination that there is no exact match between the text input and items in the hierarchical database, present the search results in the graphical user interface on a display device, the search results comprising items in the hierarchical database that are potentially related to the text input, wherein an entry for an item in the search results includes at least one lexicographically related identifier for a table name corresponding to an item in the search results and a logically related selectable option of the plurality of selectable options associated with a table corresponding to the table name, wherein the logically related selectable option comprises an action to be performed with respect to the table, the action including at least one of drop table, view data, query or view hierarchy for altering the table from the hierarchical database structure.

7. The device of claim 6, wherein the selectable options appear as text in the graphical user interface.

8. The device of claim 6, wherein the search unit is further configured to: detect that the text input defines a path to another one of the items in the hierarchical database structure; access the other one of the items by traversing the path in the hierarchical database structure; and the presentation unit is further configured to present, in the graphical user interface, data associated with the one of the items.

9. The device of claim 6, wherein a second entry for an item in the search results includes the least one lexicographically related identifier for the table name corresponding to an item in the search results and a second logically related selectable option of the plurality of selectable options associated with the table corresponding to the table name, wherein the second logically related selectable option comprises a second action to be performed with respect to the table, the second action including at least one of drop table, view data, query, or view hierarchy.

10. The device of claim 6, wherein the data associated with the one of the items includes one or more of: at least a portion of the database schemas, and at least a portion of the indexes.

11. A non-transitory computer readable storage medium including instructions which when executed by one or more processors of a computer system perform operations for searching a hierarchical database structure of a database management system, the operations comprising:

detecting text input in a database search field of a graphical user interface of the computer system, wherein the text input defines a search for data in the hierarchical database structure, wherein the hierarchical database structure includes items, indexes for looking up data in the hierarchical database structure, and database schemas defining databases in the hierarchical database structure, and wherein the items include one or more of actions to be performed on data in the hierarchical database structure;

if the text input does not include text specifying a path in the hierarchical database structure, determining that there is no exact match between the text input and items in the hierarchical database;

selecting items for presentation on the graphical user interface from the hierarchical database structure based on the text input for inclusion in search results, wherein the text input includes one or more keywords specifying one or more filters to be applied to during selection of items in the hierarchical database structure, wherein the one or more filters include one or more filters to exclude views, sequences or stored procedures;

in response to the determining that there is no exact match between the text input and items in the hierarchical database, presenting the search results in the graphical user interface on a display device, the search results comprising items in the hierarchical database that are potentially related to the text input, wherein an entry for an item in the search results includes at least one lexicographically related identifier for a table name corresponding to an item in the search results and a logically related selectable option associated with a table corresponding to the table name, wherein the logically related selectable option comprises an action to be performed with respect to the table, the action including at least one of drop table, view data, query or view hierarchy for altering the table from the hierarchical database structure; and detecting input representing a user's selection of the logically related selectable option.

12. The computer readable storage medium of claim 11, wherein the selectable option appears as text in the graphical user interface.

13. The computer readable storage medium of claim 11 wherein the operations further comprise: detecting that the text input defines a path to another one of the items in the hierarchical database structure; accessing the other one of the items by traversing the path in the hierarchical database structure; and presenting, in the graphical user interface, data associated with the one of the items.

14. The computer readable storage medium of claim 11, wherein the action further includes at least one of view data, query, or view hierarchy.

15. The computer readable storage medium of claim 11, wherein the data associated with the one of the items includes one or more of: at least a portion of the database schemas, and at least a portion of the indexes.

* * * * *